(12) United States Patent
Heiskala

(10) Patent No.: US 6,298,035 B1
(45) Date of Patent: Oct. 2, 2001

(54) ESTIMATION OF TWO PROPAGATION CHANNELS IN OFDM

(75) Inventor: Juha Heiskala, Irving, TX (US)

(73) Assignee: Nokia Networks Oy, Espoo (FI)

( * ) Notice: Subject to any disclaimer, the term of this patent is extended or adjusted under 35 U.S.C. 154(b) by 0 days.

(21) Appl. No.: 09/468,313

(22) Filed: Dec. 21, 1999

(51) Int. Cl.[7] .............................. H04K 1/10; H04L 27/28
(52) U.S. Cl. ........................ 370/206; 370/208; 375/260; 375/349; 455/60; 455/63
(58) Field of Search ................................. 370/203, 206, 370/207, 208, 480, 482; 375/260, 261, 267, 346, 347, 348, 349, 350; 455/296, 303, 59, 60, 63

(56) References Cited

U.S. PATENT DOCUMENTS

| | | | |
|---|---|---|---|
| 5,005,188 | * 4/1991 | Clark ................................ | 375/94 |
| 5,127,051 | * 6/1992 | Chan et al. ........................ | 380/49 |
| 5,732,113 | 3/1998 | Schmidl et al. ................... | 375/355 |
| 5,828,650 | 10/1998 | Malkamäki et al. .............. | 370/203 |
| 5,867,478 | * 2/1999 | Baum et al. ....................... | 370/203 |
| 5,912,876 | 6/1999 | H'mimy ............................ | 370/210 |
| 5,923,666 | 7/1999 | Gledhill et al. ................... | 370/480 |
| 5,933,768 | * 8/1999 | Skold et al. ....................... | 455/296 |
| 5,953,311 | 9/1999 | Davies et al. ..................... | 370/210 |
| 5,956,318 | 9/1999 | Saeki ................................. | 370/206 |
| 5,973,642 | 10/1999 | Li et al. ............................ | 342/378 |
| 6,141,393 | * 10/2000 | Thomas et al. ................... | 375/347 |
| 6,144,711 | * 11/2000 | Raleigh et al. ................... | 375/347 |

* cited by examiner

*Primary Examiner*—Alpus H. Hsu
(74) *Attorney, Agent, or Firm*—Banner & Witcoff, Ltd.

(57) ABSTRACT

A method and apparatus for estimating separate channel frequency responses for two channels in an orthogonal frequency division multiplexing system with two transmitters is disclosed. The channel frequency responses are estimated using specifically selected training symbols that are broadcast from the two transmitters. The training symbols are specifically selected so as to improve the estimation of the channel frequency responses for each channel, while requiring the same amount of training symbols as in an estimation of the channel frequency response of a single channel.

20 Claims, 5 Drawing Sheets

ESTIMATION OF TWO PROPAGATION CHANNELS IN OFDM

FIELD OF THE INVENTION

The invention relates to channel estimation, and more particularly to a method and apparatus for estimating two propagation channels in an Orthogonal Frequency Division Multiplexing (OFDM) system with two transmitter antennas using specifically selected training information.

BACKGROUND OF THE INVENTION

The growing area of personal communications systems is providing individuals with personal terminals capable of supporting various services such as multimedia. These services require the use of increased bit rates due to the large amount of data required to be transferred. The use of increased bit rates generates problems in conventional single carrier systems due to inter-symbol interference (ISI) and deep frequency selective fading problems.

One solution to these problems utilizes orthogonal frequency division multiplexing (OFDM) within the radio mobile environment to minimize the above-mentioned problems. Within OFDM, a signal is transmitted on multi-orthogonal carriers having less bandwidth than the coherence bandwidth of the channel in order to combat frequency selective fading of the transmitted signal. The inter-symbol interference is mitigated by the use of guard intervals. OFDM systems are presently adopted in Europe for digital audio broadcasting and have been proposed for use in digital TV broadcasting systems. It is used also in asymmetric digital subscriber lines (ADSL) to transmit high rate data. OFDM has also been selected as the modulation method for wireless local area network (WLAN) standards in United States, Europe and Japan.

Transmitter diversity is an effective technique to mitigate multipath fading. One significant advantage of transmitter diversity is that the receiver needs only one antenna with Radio Frequency (RF) receiving chain. Since RF components are quite expensive the cost of the receiver can be reduced with transmitter diversity compared to a system using receiver diversity, that needs two or more antennas and corresponding receiving RF chains. Recently Space-Time Codes (STC) have been introduced as a method to achieve transmitter diversity system. Space-Time codes encode information over multiple antennas to achieve diversity advantage, however decoding of STC needs an estimate of the propagation path from each transmitter antenna to the receiver antenna.

Since radio channels often are subjected to multipath propagation, the receiver needs to comprise some sort of equalizer to eliminate this phenomenon. The equalizer requires an estimated frequency response of the transmission channel, i.e., a channel estimation. Existing channel estimation methods are based on adaptive signal processing wherein the channels are assumed to vary slowly. The estimated channel parameters at a particular time depend on the received data and channel parameters at a previous time. In the case of fast varying channels, such as in high data rate mobile systems, these methods must be modified to reduce the estimation time.

Single channel estimation is a well known problem and numerous methods exist to solve that problem. However, their extension to estimating multiple channels in an OFDM system has not been discussed. For example, Space-Time coded communication systems use multiple transmit antennas to achieve transmitter diversity gain, but require each propagation channel to be separately estimated. A trivial way to use existing single channel estimation algorithms is to separate transmission of the training information in time for each transmit antenna. Then, the existing algorithms can be used for each antenna as each antenna is transmitting training information.

A drawback of separating the training information in time is that it reduces the amount of information used to estimate each channel, provided that a fixed amount of training data is available. Time divisioning the training data between two antennas decreases the quality of the estimate of each channel. Another option is to double the amount of training data, which in turn increases the system overhead.

SUMMARY OF THE INVENTION

It is an object of the present invention to overcome the deficiencies described above by providing a method and apparatus for estimating separate channel frequency responses in a communication system with two transmitters. The channel frequency responses are estimated using specifically selected training symbols that are broadcast from the two transmitters. The invention has the advantage of retaining the same amount of training symbols as required in a single channel estimation case while improving the channel estimate for each channel.

According to one embodiment of the present invention, a method and apparatus for estimating separate channel frequency responses for channels in an orthogonal frequency division multiplexing system with two transmitters is disclosed. First and second training symbols (A1, A2) and data from a first transmitter are transmitted to a receiver using a first channel. Third and fourth training symbols (B1, B2) and data from a second transmitter are transmitted to the receiver using a second channel. First and second received symbols are received at the receiver. The first and second received symbols are then combined. A first channel estimate and a second channel estimate are then derived from the combined received symbols, wherein the first and second received symbols comprise the training symbols, wherein the first and third training symbols form a first symbol pair and the second and fourth training symbols form a second symbol pair.

BRIEF DESCRIPTION OF THE FIGURES

For a better understanding of these and other objects of the present invention, reference is made to the detailed description of the invention, by way of example, which is to be read in conjunction with the following drawings, wherein.

DETAILED DESCRIPTION

Orthogonal frequency division multiplexing is a robust technique for efficiently transmitting data over a channel.

The technique uses a plurality of sub-carrier frequencies (sub-carriers) within a channel bandwidth to transmit the data. These sub-carriers are arranged for optimal bandwidth efficiency compared to more conventional transmission approaches, such as frequency division multiplexing (FDM), which waste large portions of the channel bandwidth in order to separate and isolate the sub-carrier frequency spectra and thereby avoid intercarrier interference (ICI). By contrast, although the frequency spectra of OFDM sub-carriers overlap significantly within the OFDM channel bandwidth, OFDM nonetheless allows resolution and recovery of the information that has been modulated onto each sub-carrier. Additionally, OFDM is much less susceptible to data loss due to multipath fading than other conventional approaches for data transmission because intersymbol interference is prevented through the use of OFDM symbols that are long in comparison to the length of the channel impulse response. Also, the coding of data onto the OFDM sub-carriers can take advantage of frequency diversity to mitigate loss due to frequency-selective fading.

Figure 1:
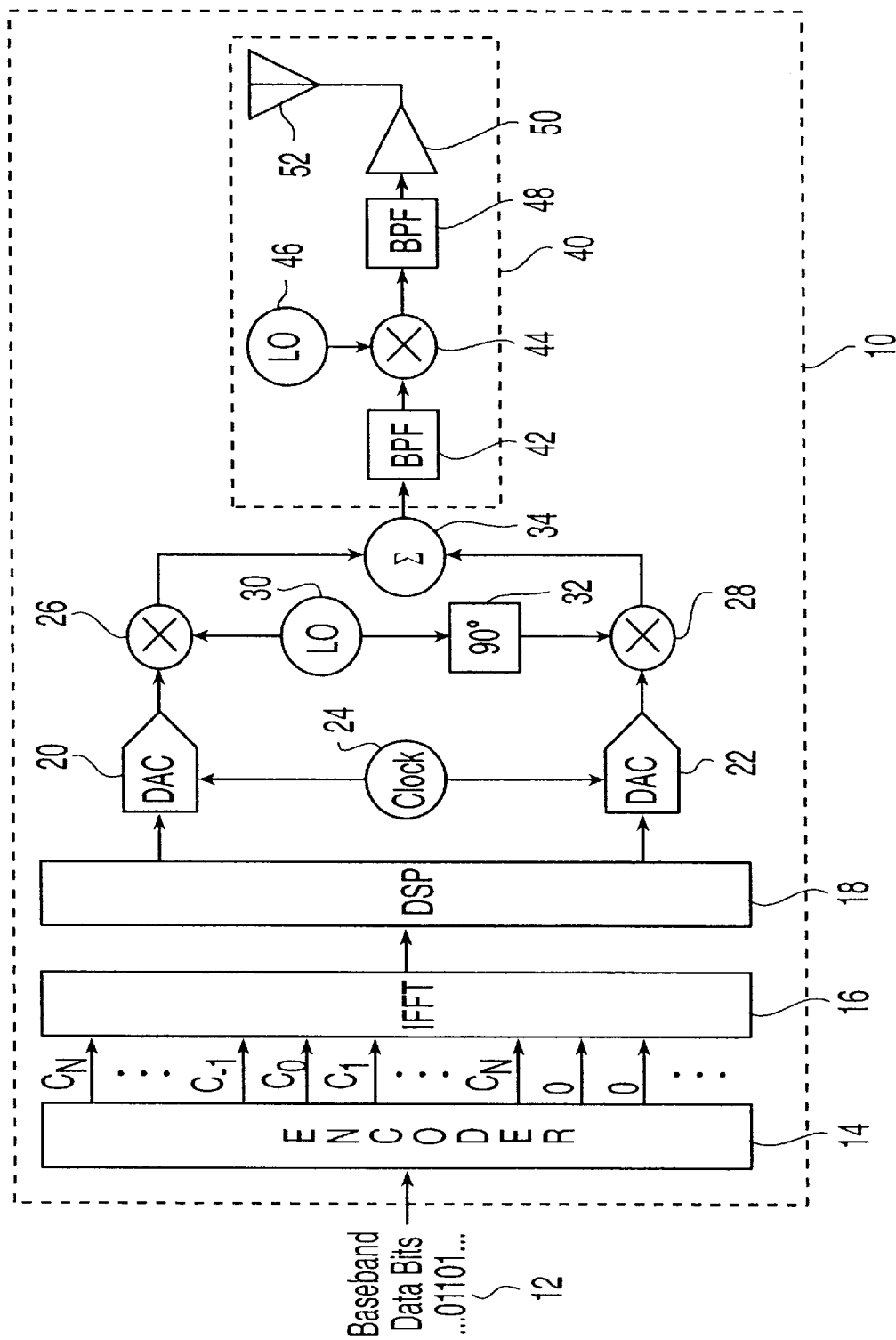
FIG. 1 is a block diagram of a typical OFDM transmitter according to the prior art.

The general principles of OFDM signal transmission can be described with reference to FIG. 1 which is a block diagram of a typical OFDM transmitter according to the prior art. An OFDM transmitter 10 receives a stream of baseband data bits 12 as its input. These input data bits 12 are immediately fed into an encoder 14, which takes these data bits 12 in segments of B bits every $T_g+T_s$ seconds, where $T_s$ is an OFDM symbol interval and $T_g$ is a cyclic prefix or guard interval. The encoder 14 typically uses a block and/or convolutional coding scheme to introduce error-correcting and/or error-detecting redundancy into the segment of B bits and then sub-divides the coded bits into 2N sub-segments of m bits. The integer m typically ranges from 2 to 6.

In a typical OFDM system, there are 2N+1 OFDM sub-carriers, including the zero frequency DC sub-carrier which is not generally used to transmit data since it has no frequency and therefore no phase. Accordingly, the encoder 14 then typically performs $2^m$-ary quadrature amplitude modulation (QAM) encoding of the 2N sub-segments of m bits in order to map the sub-segments of m bits to predetermined corresponding complex-valued points in a $2^m$-ary constellation. Each complex-valued point in the constellation represents discrete values of phase and amplitude. In this way, the encoder 14 assigns to each of the 2N sub-segments of m bits a corresponding complex-valued $2^m$-ary QAM sub-symbol $c_k=a_k+jb_k$, where $-N1 \leq k \leq N1$, in order to create a sequence of frequency-domain sub-symbols that encodes the B data bits. Also, the zero-frequency sub-carrier is typically assigned $c_0=0$. The encoder 14 then passes the sequence of subsymbols, along with any additional zeros that may be required for interpolation to simplify filtering, on to an inverse discrete Fourier transformer (IDFT) or, preferably, an inverse fast Fourier transformer (IFFT) 16.

Upon receiving the sequence of OFDM frequency-domain sub-symbols from the encoder 14, the IFFT 16 performs an inverse Fourier transform on the sequence of sub-symbols. In other words, it uses each of the complex-valued sub-symbols, $c_k$, to modulate the phase and amplitude of a corresponding one of 2N+1 sub-carrier frequencies over a symbol interval $T_s$. The sub-carriers are given by $e^{-2\pi j f_k t}$, and therefore, have baseband frequencies of $f_k=k/T_s$, where k is the frequency number and is an integer in the range $-N \leq k \leq N$. The IFFT 16 thereby produces a digital time-domain OFDM symbol of duration $T_s$ given by $$U(t) = \sum_{k=-N}^{N} c_k \exp(-2\pi f_k t).$$

Figures 2, 5:
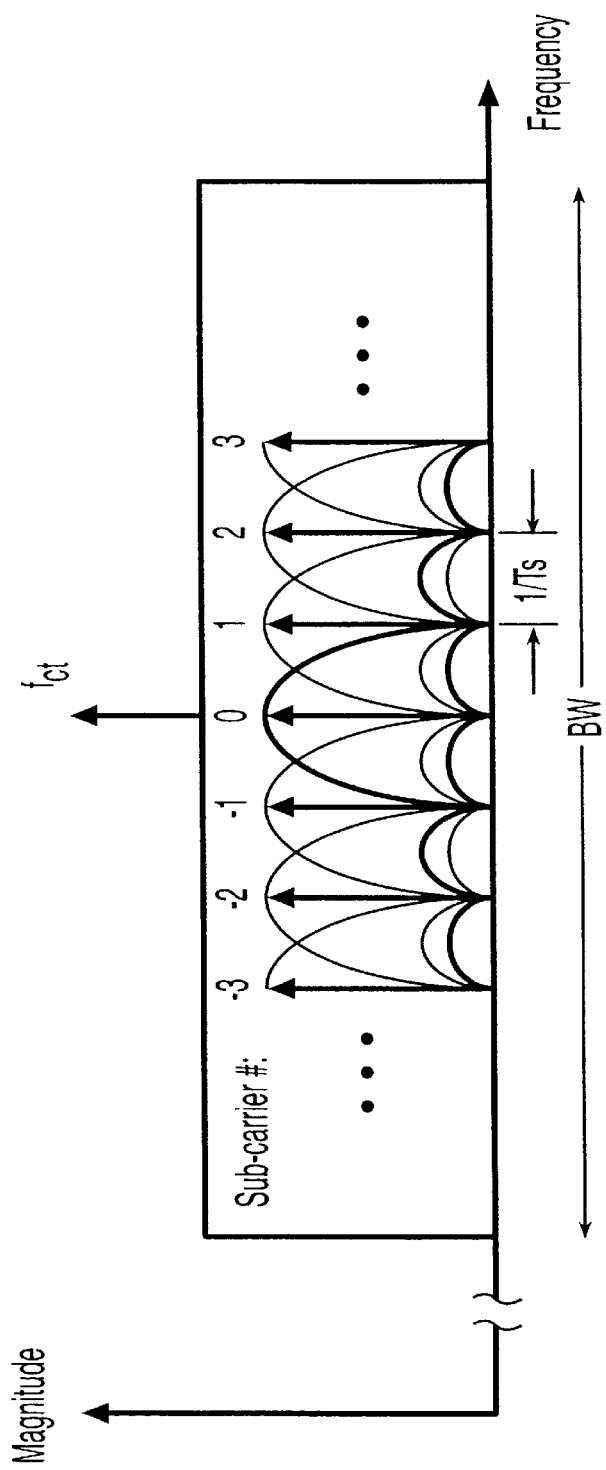
FIG. 2 is an illustration of a typical OFDM signal within an OFDM channel bandwidth showing the frequency domain positioning of OFDM sub-carriers and their modulated spectra, according to the prior art.
FIG. 5 illustrates the transmission of training information according to one embodiment of the invention.

As a result of this discrete-valued modulation of the OFDM sub-carriers by frequency-domain sub-symbol intervals of $T_s$ seconds, the OFDM sub-carriers each display a sinc x=(sin x)/x spectrum in the frequency domain. By spacing each of the 2N+1 sub-carriers $1/T_s$ apart in the frequency domain, the primary peak of each sub-carriers sinc x spectrum coincides with a null of the spectrum of every other sub-carrier. In this way, although the spectra of the sub-carriers overlap, they remain orthogonal to one another. FIG. 2 illustrates the arrangement of the OFDM sub-carriers as well as the envelope of their modulated spectra within an OFDM channel bandwidth, BW, centered around a carrier frequency, $f_{cr}$. Note that the modulated sub-carriers fill the channel bandwidth very efficiently.

Returning to FIG. 1, the digital time-domain OFDM symbols produced by the IFFT 16 are then passed to a digital signal processor (DSP) 18. The DSP 18 performs additional spectral shaping on the digital time-domain OFDM symbols and also adds a cyclic prefix or guard interval of length $T_g$ to each symbol. The cyclic prefix is generally just a repetition of part of the symbol. This cyclic prefix is typically longer than the OFDM channel impulse response and, therefore, acts to prevent inter-symbol interference (ISI) between consecutive symbols.

The real and imaginary-valued digital components that make up the cyclically extended, spectrally-shaped digital time-domain OFDM symbols are then passed to digital-to-analog converters (DACs) 20 and 22, respectively. The DACs 20 and 22 convert the real and imaginary-valued digital components of the time-domain OFDM symbols into in-phase and quadrature OFDM analog signals, respectively, at a conversion or sampling rate of $f_{ck\_r}$ as determined by a clock circuit 24. The in-phase and quadrature OFDM signals are then passed to mixers 26 and 28, respectively.

In the mixers 26 and 28, the in-phase and quadrature OFDM signals from the DACs 20 and 22 are used to modulate an in-phase intermediate frequency signal (IF) and a 90° phase-shifted (quadrature) IF signal, respectively, in order to produce an in-phase IF OFDM signal and a quadrature IF OFDM signal, respectively. The in-phase IF signal that is fed to the mixer 26 is produced directly by a local oscillator 30, while the 90° phase-shifted IF signal that is fed to the mixer 28 is produced by passing the in-phase IF signal produced by the local oscillator 30 through a 90° phase-shifter 32 before feeding it to the mixer 28. These two in-phase and quadrature IF OFDM signals are then combined in a combiner 34 to form a composite IF OFDM signal. In some prior art transmitters, the IF mixing is performed in the digital domain using a digital synthesizer and digital mixers before the digital-to-analog conversion is performed.

This composite IF OFDM signal is then passed into radio frequency transmitter 40. Many variations of RF transmitter 40 exist and are well known in the art, but typically, the RF transmitter 40 includes an IF bandpass filter 42, an RF mixer 44, an RF carrier frequency local oscillator 46, an RF baseband filter 48, an RF power amplifier 50, and an antenna 52. The RF transmitter 40 takes the IF OFDM signal from the combiner 34 and uses it to modulate a transmit carrier of frequency $f_c$, generated by the RF local oscillator 46, in order to produce an RF OFDM-modulated carrier that occupies a channel bandwidth, BM. Because the entire OFDM signal must fit within this channel bandwidth, the channel bandwidth must be at least $(1/T_s)\cdot(2N+1)$ Hz wide to accommodate all the modulated OFDM sub-carriers. The frequency-domain characteristics of this RF OFDM-modulated carrier are illustrated in FIG. 2. This RF OFDM-modulated carrier is then transmitted from antenna 52 through a channel, to an OFDM receiver in a remote location. In alternative embodiments of RF transmitters, the OFDM signal is used to modulate the transmit carrier using frequency modulation, single-sided modulation, or other modulation techniques. Therefore, the resulting RF OFDM-modulated carrier may not necessarily have the exact shape of the RF OFDM-modulated carrier illustrated in FIG. 2, i.e., the RF OFDM-modulated carrier might not be centered around the transmit carrier, but instead may lie to either side of it.

Figure 3:
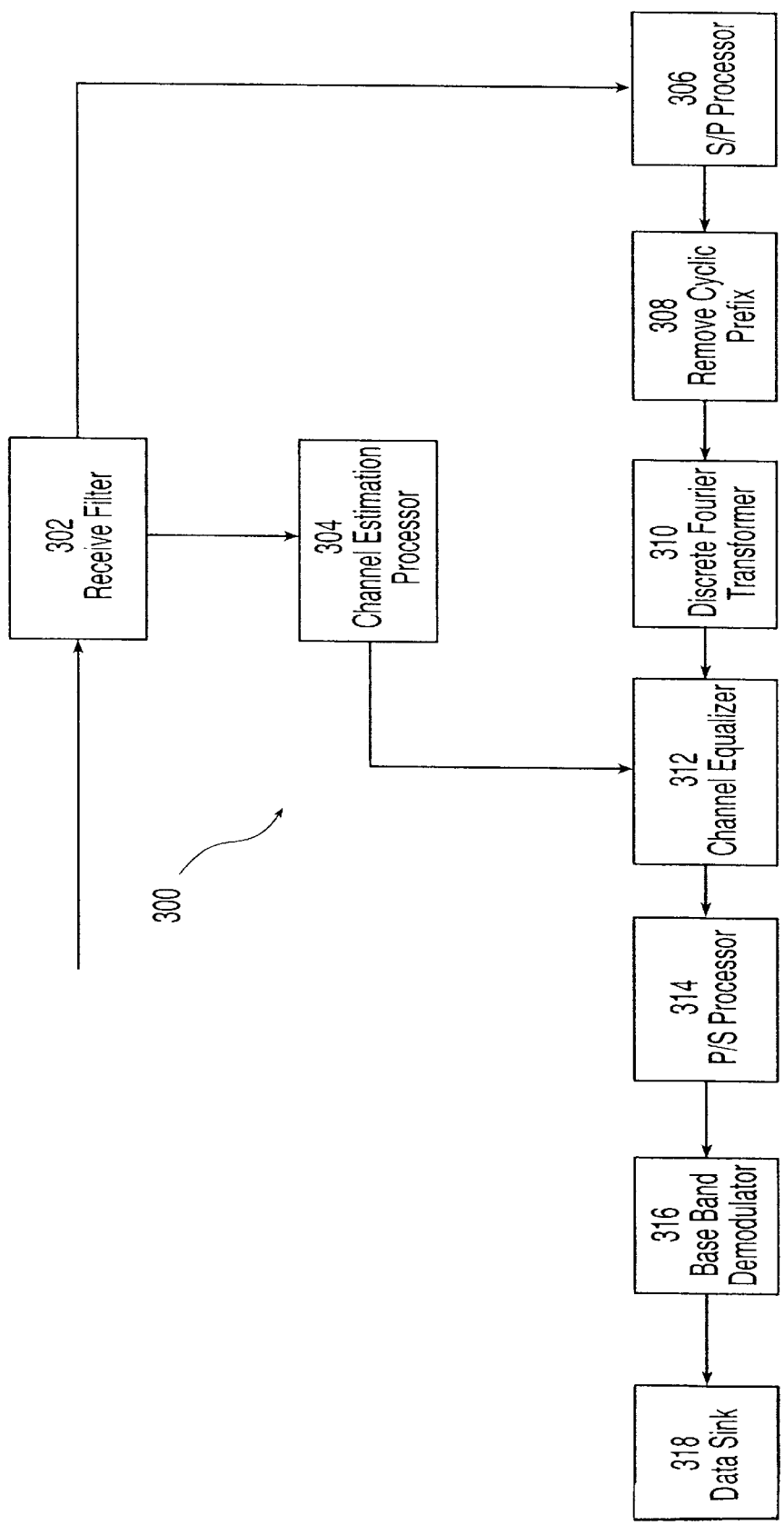
FIG. 3 is a block diagram of a typical OFDM receiver according to the prior art.

In order to receive the OFDM signal and to recover at a remote location the baseband data bits that have been encoded into the OFDM sub-carriers, an OFDM receiver must perform essentially the inverse of all of the operations performed by the OFDM transmitter described above. These operations can be described with reference to FIG. 3 which is a block diagram of a typical OFDM receiver according to the prior art.

The received signal is first filtered in a receiver filter 302 so as to limit the bandwidth of the received signal. The band limited received signal is then sent to a channel estimator 304, wherein the channel estimator comprises a processor. The channel estimator processes the band limited received signal to produce an estimate of the channel frequency response ($\hat{H}_k$k) Of the transmit channel. In this example, the channel estimator also performs frame synchronization in a known manner and produces an estimate of the frame timing ($\hat{T}_F$).

The estimate of the frame timing ($\hat{T}_F$) is sent to S/P processor 306 which converts the serial data input stream from the receive filter 302 and frame timing from the channel estimator into a parallel stream by framing N symbols. The S/P 306 outputs a received cyclically extended OFDM frame. The cyclic prefix attached to the OFDM data frame is then removed in processor 308. With proper synchronization, the inter-frame interference is removed. The received OFDM data frame is then sent to the Discrete Fourier Transformer DFT 310. The DFT 310 implements the OFDM demodulator with N sub-carriers using the discrete Fourier transform, wherein the input corresponds to the time domain and the output to the frequency domain. The DFT 310 outputs the transmitted modulated symbols affected by the channel frequency response to a channel equalizer 312.

The channel equalizer 312 receives the estimated channel frequency response and the transmitted modulated signals. The channel equalizer 312 performs frequency domain zero-forcing equalization of the OFDM sub-carriers. Only sub-carriers with magnitudes above a certain predetermined threshold value are equalized, since magnitudes below the predetermined threshold value are considered unreliable. The channel equalizer 312 outputs recovered modulated signals. The recovered modulated signals are converted from N-symbol parallel data streams (frames) into a serial stream in a P/S processor 314. The serial stream is then inputted into a base band demodulator 316. The base band demodulator 316 demodulates the recovered modulated signals and maps one input symbol into k binary symbols according to the base band signaling scheme. The base band demodulator outputs received binary data to a data sink 318 which applies application specific processing to the received data.

Figure 4:
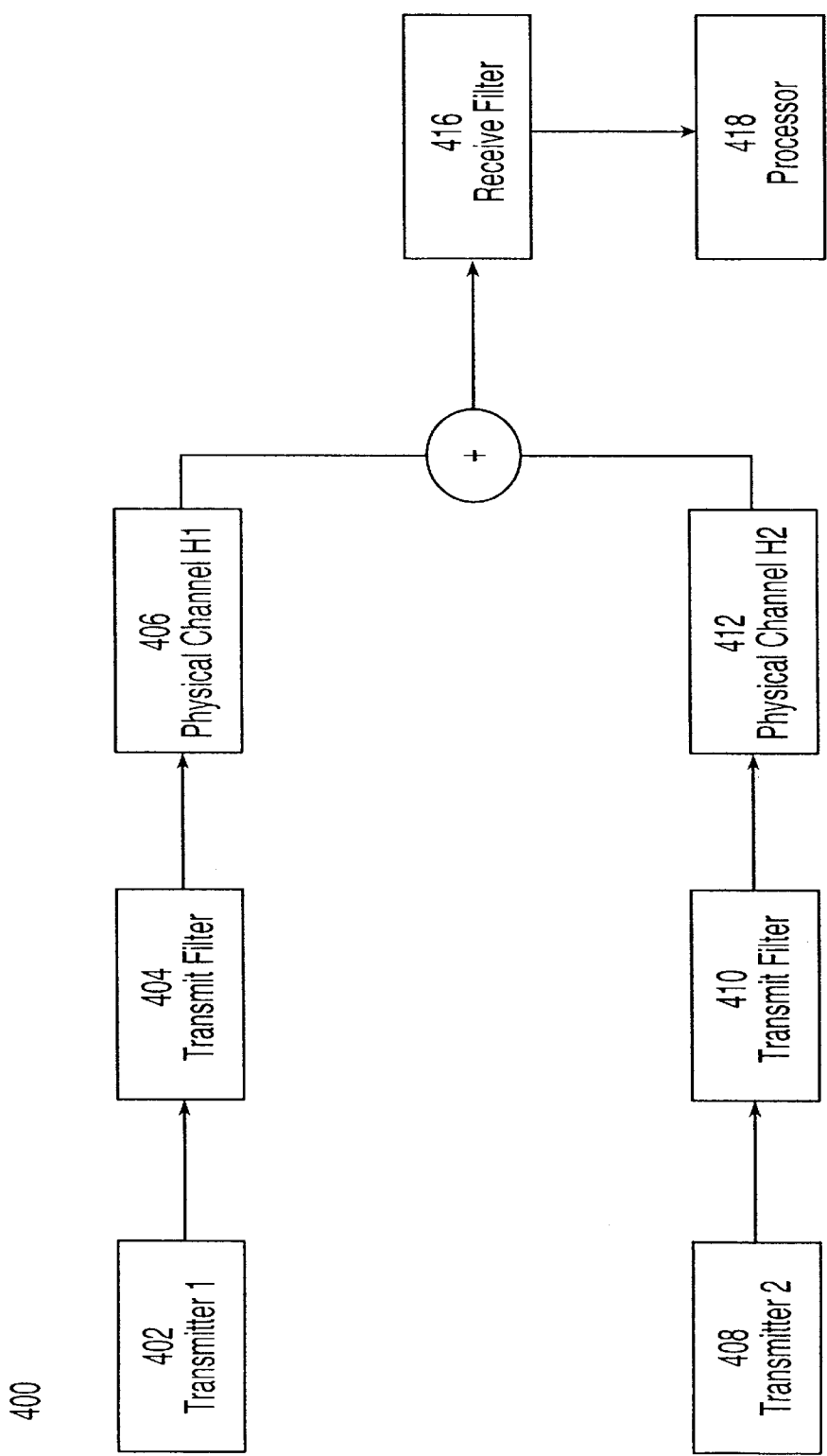
FIG. 4 is a block diagram of an OFDM communication system with two transmit antennas and one receive antenna according to one embodiment of the invention.

FIG. 4 shows a model of an OFDM communication system 400 with two transmit antennas and one receive antenna. This system has two separate propagation channels H1 and H2. The goal of this embodiment of the present invention is to estimate the channel frequency response of both of these channels using the structure of the training information. A first transmitter 402 prepares information to be transmitted, for example in the manner set forth above with respect to FIG. 1, and the information is sent to a transmit filter 404 and then transmitted to the receiver 414 through the physical channel H1 (406). During transmission, noise is unavoidably added to the transmitted signal. A second transmitter 408 prepares information to be transmitted and sends the information to a transmit filter 410. The information is then transmitted to the receiver 414 through the physical channel H2 (412). During transmission, noise is unavoidably added to the transmitted signal. When the signals are received at the receiver 414, the signals are filtered in a receive filter 416 and are then processed in a processor 418. One of the operations of the processor 418 is to estimate a channel frequency response of channels H1 and H2.

FIG. 5 shows how the training information is transmitted by the two transmitters 402 and 408. The first transmitter 402 transmits OFDM training symbols A1 and A2, and the second transmitter 408 transmits OFDM training symbols B1 and B2. The goal of the receiver is to separate the OFDM symbols so that all the information in A1 and A2 can be used to estimate the channel frequency response of channel H1 and all of the information in B1 and B2 can be used to estimate the channel frequency response of channel H2.

Figure 6:
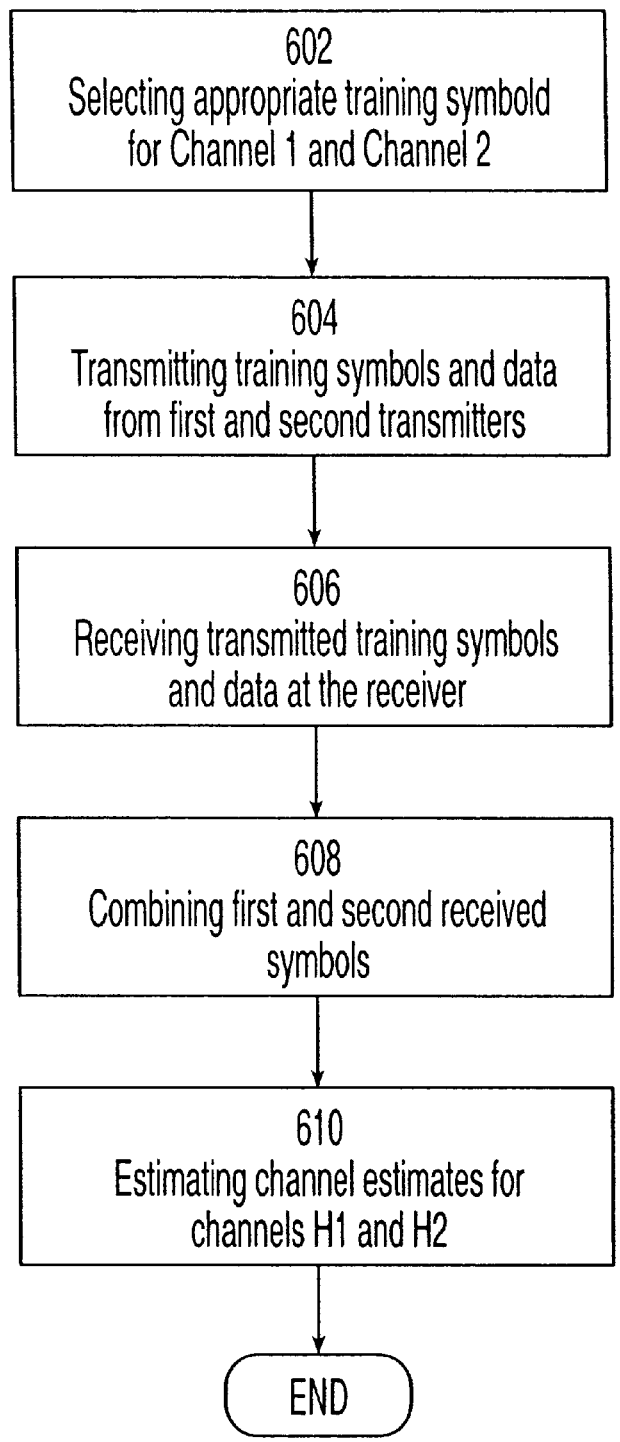
FIG. 6 is a flow chart illustrating a channel estimation process according to one embodiment of the invention.

The operation of one embodiment of the present invention will now be described with reference to FIG. 6. As will be explained below in more detail, the transmitters 402 and 408 select the appropriate training symbols in step 602 and transmit the training symbols and data over physical channels H1 and H2, respectively, in step 604. The transmitted training symbols and data are then received at the receiver 414 in step 606. The first received symbol R1 at the receiver in frequency-domain during the transmission of the training symbols A1 and B1, with additive noise N1 is $$R1=H1\cdot A1+H2\cdot B1+N1$$

and the second received symbol R2 during transmission of the training symbols A2 and B2, with additive noise N2 is $$R2=H1\cdot A2+H2\cdot B2+N2$$

To achieve noise reduction, the signals R1 and R2 are added together in step 608

$$R=R1+R2=H1\cdot A1+H2\cdot B1+H1\cdot A2+H2\cdot B2+N1+N2$$

After reordering the terms $$R=H1\cdot(A1+A2)+H2\cdot(B1+B2)+N1+N2.$$

To estimate H1 it is necessary to remove the effects of H2 on the received signal R and vice versa. As a result, B1+B2 should be equal to zero while preserving A1+A2, and vice versa. One solution according to one embodiment of the present invention is to select A1, A2, B1 and B2 as follows:

A1 is a set of complex numbers, one number for each subcarrier $$A2=A1$$

$$B1=A1$$

$$B2=A1$$

and $$|A1|^2=1$$

In this case, the sum of R1 and R2 is $$R=R1+R2=H1 \cdot A1+H2 \cdot A1+H1 \cdot A1-H2 \cdot A1+N1+N2=2 \cdot H1 \cdot A1+H2 \cdot (A1-A1)+N1+N2=2 \cdot H1 \cdot A1+N1+N2$$

In step 610, the channel frequency response A1 can now be estimated by multiplying R by $$\hat{H}1 = \frac{A1^* \cdot R + N1 + N2}{2} = H1 \cdot |A1|^2 + \frac{N1+N2}{2} = H1 + \frac{N1+N2}{2}$$

A1 conjugate and dividing by 2. Since noise is independent, its power is reduced by 2.

Similarly, the channel frequency response $\hat{H}2$ of channel $\hat{H}2$ can be estimated by subtracting R1 and R2.

$$R=R1-R2+N1+N2=H1 \cdot A1+H2 \cdot A1-H1 \cdot A1+H2 \cdot A1+N1-N2=H1 \cdot (A1-A2)+2H2 \cdot A1+N1-N2+2 \cdot H2 \cdot A1+N1-N2$$

Now, the channel frequency response $\hat{H}2$ can be estimated by multiplying R by A1 conjugate and $$\hat{H}2 = \frac{A1^* \cdot R}{2} = H2 \cdot |A1|^2 + \frac{N1-N2}{2} = H2 + \frac{N1-N2}{2}$$

$$\hat{H}2 = \frac{A1^* \cdot R}{2} = H2 \cdot |A1|^2 + \frac{N1-N2}{2} = H2 + \frac{N1-N2}{2}$$

dividing by 2.

One drawback with this solution is, if H1=H2, as in the additive White Gaussian Noise (AWGN) channel, the received signal during A2 and B2 is equal to A1−A1=0, so nothing is received. To remove this effect, the symbol pairs (A1,B1) and (A2,B2) should be orthogonal. In this case, they will not cancel each other, if the channels H1 and H2 happen to be equal.

According to another embodiment of the present invention, the following selection of the symbols A1, A2, B1, B2 has all of the required properties to avoid the problems in the additive White Gaussian Noise channel. Symbol pairs (A1, B1) and (A2, B2) have a 90° phase-shift, so they are orthogonal and will not cancel each other out in an Additive Gaussian Noise channel. Also, the channel estimation can be performed using both A1 and A2 for H1, and B1 and B2 for H2.

A1 is a set of complex numbers, one number for each subcarrier $$A2=A1$$

$$B1=e^{j\pi/2}A1$$

$$B2=e^{-j\pi/2}A1$$

and $$|A1|^2=1$$

With these training symbols, the channel estimation can be performed in the following manner for H1:

$$R=R1+R2+N1+N2=H1 \cdot A1+H2 \cdot e^{j\pi/2} \cdot A1+H1 \cdot A1+H2 \cdot e^{-j\pi/2} \cdot A1+N1+N=2 \cdot H1 \cdot A1+H2 \cdot A1(e^{j\pi/2}+e^{-j\pi/2})+N1+N2=2 \cdot H1 \cdot A1+N1+N2$$

Now, the channel frequency response $\hat{H}1$ can be estimated by multiplying R by A1 conjugate and $$\hat{H}1 = \frac{A1^* \cdot R}{2} = H1 \cdot |A1|^2 + \frac{N1+N2}{2} = H1 + \frac{N1+N2}{2}$$

dividing by two:

The estimation of the channel frequency response of channel $\hat{H}2$ can then be performed as follows:

$$R=e^{-j\pi/2} \cdot R1+e^{j\pi/2} \cdot R2=H1 \cdot e^{-j\pi/2} \cdot A1+H2 \cdot A1+H1 \cdot e^{j\pi/2} \cdot A1+H2 \cdot A1+N1+N2=H1 \cdot A1 \cdot (e^{-j\pi/2})+2 \cdot H2 \cdot A1+N1+N2=2 \cdot H2 \cdot A1+N1+N2$$

Now, the channel frequency response of $\hat{H}2$ can be estimated with the following equation:

$$\hat{H}2 = \frac{A1^* \cdot R + N1 + N2}{2} = H2 \cdot |A1|^2 + \frac{N1+N2}{2} = H2 + \frac{N1+N2}{2}$$

Although preferred embodiments of the method and apparatus of the present invention have been illustrated in the accompanying Drawings and described in the foregoing Detailed Description, it is understood that the invention is not limited to the embodiments disclosed, but is capable of numerous rearrangements, modifications, and substitutions without departing from the spirit or scope of the invention as set forth and defined by the following claims.

What is claimed is:

1. A method for estimating separate channel frequency responses for channels in an orthogonal frequency division multiplexing system with two transmitters, each having an antenna, comprising the steps of:

selecting training symbols for each said antenna that allow for separately estimating the frequency response of each channel;

transmitting the training symbols selected for a first antenna from a first transmitter to a receiver using a first channel;

transmitting the training symbols selected for a second antenna from a second transmitter to the receiver using a second channel;

receiving training symbols at the receiver; and estimating a first channel estimate and a second channel estimate from the received training symbols.

2. The method according to claim 1, wherein said symbols are orthogonal.

3. The method according to claim 1, wherein A1 and A2 are training symbols for the first antenna, B1 and B2 are training symbols for the second antenna, wherein A1 is a set of complex numbers, one number for each subcarrier $$A2=A1$$

$$B1=A1$$

$$B2=-A1$$

and $$|A1|^2=1.$$

4. The method according to claim 1, wherein a first received training symbol (R1) equals $$R1=H1 \cdot A1+H2 \cdot B1+N1$$

and a second received training symbol R2 equals $$R2=H1 \cdot A2+H2 \cdot B2+N2$$

wherein N1 and N2 are noise.

5. The method according to claim 3, wherein the first channel estimate (Ĥ1) equals $$\hat{H}1=H1+(N1+N2)/2$$

and the second channel estimate (Ĥ2) equals $$\hat{H}2=H2+(N1+N2)/2$$

wherein N1 and N2 are noise.

6. The method according to claim 1, wherein A1 and A2 are training symbols for the first antenna, B1 and B2 are training symbols for the second antenna, wherein A1 is a set of complex numbers, one number for each subcarrier $$A2=A1$$

$$B1=e^{j\pi/2}A1$$

$$B2=e^{-j\pi/2}A1$$

and $$|A1|^2=1.$$

7. The method according to claim 6, wherein the first channel estimate (Ĥ1) equals $$\hat{H}1=H1+(N1+N2)/2$$

and the second channel estimate (Ĥ2) equals $$\hat{H}2=H2+(N1+N2)/2$$

wherein N1 and N2 are noise.

8. A system for estimating separate channel frequency responses for channels in an orthogonal frequency division multiplexing system with two transmitter antennas, comprising:

training symbols selected for each antenna that allow for separately estimating the frequency response of each channel;

a first transmitter that transmits the training symbols selected for the first antenna and data from a first transmitter to a receiver using a first channel;

a second transmitter that transmits the training symbols selected for the second antenna and data from a second transmitter to the receiver using a second channel;

the receiver which receives received training symbols at the receiver;

a combiner that combines said first and second received symbols; and a processor that estimates a first channel estimate and a second channel estimate from the combined received symbols.

9. The system according to claim 8, wherein A1 and A2 are training symbols for the first antenna, B1 and B2 are training symbols for the second antenna, wherein A1 is a set of complex numbers, one number for each subcarrier $$A2=A1$$

$$B1=A1$$

$$B2=-A1$$

and $$|A1|^2=1.$$

10. The system according to claim 8, wherein the first received symbol (R1) equals $$R1=H1 \cdot A1+H2 \cdot B1+N1$$

and the second received symbol R2 equals $$R2=H1 \cdot A2+H2 \cdot B2+N2$$

wherein N1 and N2 are noise.

11. The system according to claim 9, wherein the first channel estimate (Ĥ1) equals $$\hat{H}1=H1+(N1+N2)/2$$

and the second channel estimate (Ĥ2) equals $$H2=H2+(N1+N2)/2$$

wherein N1 and N2 are noise.

12. The system according to claim 8, wherein A1 and A2 are training symbols for the first antenna, B1 and B2 are training symbols for the second antenna A1 is a set of complex numbers, one number for each subcarrier $$A2=A1$$

$$B1=e^{j\pi/2}A1$$

$$B2=e^{-j\pi/2}A1$$

and $$|A1|^2=1.$$

13. The system according to claim 12, wherein the first channel estimate (Ĥ1) equals $$\hat{H}1=H1+(N1+N2)/2$$

and the second channel estimate (Ĥ2) equals $$\hat{H}2=H2+(N1+N2)/2$$

wherein N1 and N2 are noise.

14. A receiver for receiving signals from two transmitters over two channels, comprising:

a filter for filtering first (R1) and second (R2) received symbols transmitted from first and second transmitters, wherein said first received symbol comprises a first training symbol (A1) from the first transmitter and a first training symbol (B1) from a second transmitter and the second received symbol (R2) comprises a second training symbol (A2) from the first transmitter and a second training symbol (B2) from the second transmitter, said training symbols being affected by each channel's frequency response;

a combiner for combining the first and second received symbols; and a processor for estimating a first channel estimate and a second channel estimate from the combined received symbols.

15. The receiver according to claim 14, wherein said symbols are orthogonal.

16. The receiver according to claim 14, wherein

A1 is a set of complex numbers, one number for each subcarrier $A2=A1$ $B1=A1$ $B2=-A1$ and $|A1|^2=1.$ 17. The receiver according to claim 14, wherein the first received symbol (R1) equals $R1=H1 \cdot A1+H2 \cdot B1+N1$ and the second received symbol R2 equals $R2=H1 \cdot A2+H2 \cdot B2+N2$ wherein N1 and N2 are noise.

18. The receiver according to claim 16, wherein the first channel estimate ($\hat{H}1$) equals $\hat{H}1=H1+(N+N2)/2$ and the second channel estimate ($\hat{H}2$) equals $H2=H2+(N1+N2)/2$ wherein N1 and N2 are noise.

19. The receiver according to claim 14, wherein

A1 is a set of complex numbers, one number for each subcarrier $A2=A1$ $B1=e^{j\pi/2}A1$ $B2=e^{-j\pi/2}A1$ and $|A1|^2=1.$ 20. The receiver according to claim 19, wherein the first channel estimate ($\hat{H}1$) equals $\hat{H}1=H1+(N1+N2)/2$ and the second channel estimate ($\hat{H}2$) equals $\hat{H}2=H2+(N1+N2)/2$ wherein N1 and N2 are noise.

* * * * *